United States Patent
Rezaei et al.

(10) Patent No.: US 12,463,555 B2
(45) Date of Patent: Nov. 4, 2025

(54) METHOD FOR ENHANCING THE OPERATION OF AN INVERTER WITH A DERATED OUTPUT FILTER CAPACITOR

(71) Applicant: FRONIUS INTERNATIONAL GMBH, Pettenbach (AT)

(72) Inventors: Mohsen Rezaei, Pettenbach (AT); Maria Crespo Cordo, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 190 days.

(21) Appl. No.: 18/557,737

(22) PCT Filed: May 5, 2022

(86) PCT No.: PCT/EP2022/062220
§ 371 (c)(1),
(2) Date: Oct. 27, 2023

(87) PCT Pub. No.: WO2022/234049
PCT Pub. Date: Nov. 10, 2022

(65) Prior Publication Data
US 2024/0305217 A1  Sep. 12, 2024

(30) Foreign Application Priority Data
May 6, 2021 (EP) .................................. 21172574

(51) Int. Cl.
*H02M 7/5387* (2007.01)
*H02J 3/18* (2006.01)
(Continued)

(52) U.S. Cl.
CPC ........... *H02M 7/53871* (2013.01); *H02J 3/18* (2013.01); *H02M 1/0009* (2021.05); *H02M 1/0016* (2021.05); *H02M 1/327* (2021.05)

(58) Field of Classification Search
CPC ............. H02M 7/53871; H02M 1/327; H02M 1/0009; H02M 1/0016; H02J 3/18
See application file for complete search history.

(56) References Cited

U.S. PATENT DOCUMENTS 9,735,696 B2 *  8/2017  Bhandarkar ........ H02M 5/4585
11,967,891 B2 *  4/2024  Li ........................ H02M 7/5395

FOREIGN PATENT DOCUMENTS

| EP | 3 173 802 A1 | 5/2017 |
| JP | 2019-161824 A | 9/2019 |
| WO | 2015/084337 A1 | 6/2015 |

OTHER PUBLICATIONS

International Search Report corresponding to PCT Application No. PCT/EP2022/062220, mailed Sep. 20, 2022 (English language document) (4 pages).

(Continued)

*Primary Examiner* — Adolf D Berhane
(74) *Attorney, Agent, or Firm* — Maginot, Moore & Beck

(57) ABSTRACT

A method for improving an operational behavior of an inverter (1), said method comprising the steps of calculating (S1) a capacitance, C, of an AC capacitor of said inverter (1) for each electrical power supply phase (L) of the inverter (1) on the basis of a measured voltage signal and a measured current signal for the respective electrical power supply phase (L) during a startup of said inverter (1) when the inverter (1) is separated by a grid relay (8) from a public or stand-alone power supply grid (9) or backup system; and compensating (S10) automatically an observed change of the capacitance, C, of the AC capacitor over time by adjusting the AC current generated by the inverter (1) for the respective electrical power supply phase (L) to optimize a reactive current injection.

19 Claims, 12 Drawing Sheets

(51) Int. Cl.
    *H02M 1/00*    (2006.01)
    *H02M 1/32*    (2007.01)

(56)           References Cited

OTHER PUBLICATIONS

Bhargava et al., "Review of Health Prognostics and Condition Monitoring of Electronic Components," IEEE Access, IEEE, Apr. 20, 2020 (Apr. 20, 2020), pp. 75163-75183, vol. 8, XP011786064, DOI: 10.1109/ACCESS.2020.2989410.

* cited by examiner

METHOD FOR ENHANCING THE OPERATION OF AN INVERTER WITH A DERATED OUTPUT FILTER CAPACITOR

PRIORITY CLAIM

This application is a U.S. national stage of PCT/EP2022/062220, filed on May 5, 2022, which claims priority to European Application No. 21172574.2, filed on May 6, 2021. The disclosure of both applications is specifically incorporated herein by reference.

FIELD OF THE INVENTION

The invention relates to a method for enhancing the operation of an inverter, in particular to a method for optimizing the reactive power injected by an inverter into a public or stand-alone power supply grid or backup system.

BACKGROUND OF THE INVENTION

An inverter can be used to convert a DC voltage into an AC voltage. The inverter can be connected to a local stand-alone power supply grid or to a public power supply grid or to a backup system. An inverter can comprise one or several power supply phases. A three-phase inverter can convert a received DC voltage into three power supply phases L1, L2, L3. A DC voltage can be applied to the DC side of the inverter by a DC voltage source such as a battery or a photovoltaic array. On the AC side, the inverter comprises an AC filter which can comprise for each power supply phase an AC capacitor. Conventionally, the capacitances C of the AC capacitors of the AC filter are measured in a production stage of the inverter. After having measured the capacitance C of each of the AC capacitors within the AC filter, the measured capacitance value is set in the control software so that a controller of the inverter can compensate the effect of an electrical current drawn by the respective AC capacitor. This is mostly done to prevent the injection of unwanted reactive currents into the respective power supply grid. However, as the inverter leaves the production stage and is installed in the field, the components of the inverter start degrading or aging over time. This is in particular true when the inverter is installed in a harsh environment. Due to the tolerance and aging of the filter capacitors of the AC filter stage over time, the capacitor current does deviate from a predefined set value. In this way, the operational behavior and performance of the inverter is degraded.

SUMMARY OF THE INVENTION

Accordingly, it is an object of the present invention to provide a method for improving the operational behavior of an inverter taking into account the aging of inverter components and/or ambient factors.

The invention provides according to a first aspect a method for enhancing an operational behavior of an inverter comprising the steps of:
  calculating a capacitance of an AC capacitor of said inverter for each electrical power supply phase of the inverter on the basis of a measured voltage signal and a measured current signal for the respective electrical power supply phase during a startup of said inverter when the inverter is separated by a grid relay from a public or stand-alone power supply grid or from a backup system and
  compensating automatically an observed change of the capacitance of the AC capacitor over by adjusting the AC current generated by the inverter for the respective electrical power supply phase to optimize a reactive current injection.

The compensation of the observed change of the capacitance of the AC capacitor over time is performed in a possible embodiment automatically based on ambient factors.

In a possible embodiment of the method according to the first aspect of the present invention, the capacitance of the AC capacitor for each electrical power supply phase of the inverter is calculated by a processor of the inverter on the basis of a predefined minimum number of voltage signal samples and current signal samples.

In a still further possible embodiment of the method according to the first aspect of the present invention, if the calculated capacitance of the AC capacitor is not within a predefined tolerance range, the inverter is automatically shut down and/or a warning message is sent by the processor of the inverter to a remote server or output via a user interface of the inverter.

In a further possible embodiment of the method according to the first aspect of the present invention, the calculated capacitance of the AC capacitor is stored along with a measured ambient temperature and/or a date stamp and/or a measured humidity in a local storage and/or a database of a cloud server.

In a further possible embodiment of the method according to the first aspect of the present invention, a phase and/or an amplitude of the AC current generated by the inverter is adjusted automatically by the processor of the inverter to compensate the observed change of the capacitance of the AC capacitor.

In a still further possible embodiment of the method according to the first aspect of the present invention, if the calculated capacitance of the AC capacitor is not within the predefined tolerance range, an automatic switchover to a redundant AC capacitor is triggered by the processor of the inverter.

In a still further possible embodiment of the method according to the first aspect of the present invention, the calculated capacitance of the AC capacitor and the associated measured ambient temperature and/or date stamp and/or humidity stored in the database of the cloud server are classified by an artificial intelligence module of the cloud server to predict the operational behavior of the AC capacitor for various ambient temperatures and/or the remaining operation lifetime of the AC capacitor and/or fault classes in the AC capacitor.

In a still further possible embodiment of the method according to the first aspect of the present invention, predictive maintenance operations are triggered automatically by the cloud server in response to the predicted operational behavior and/or the predicted operation lifetime of the AC capacitor and/or predicted fault classes in the AC capacitor.

In a further possible embodiment of the method according to the first aspect of the present invention, the calculating of the capacitance of the AC capacitor comprises:
  calculating a quadrature current signal using an integral of the measured current signal,
  calculating an average quadrature current value for the calculated quadrature current signal and
  calculating a mean square quadrature current value for the calculated quadrature current signal.

In a further possible embodiment of the method according to the first aspect of the present invention, calculating the capacitance of the AC capacitor further comprises calculating an average voltage value using the integral of the measured voltage signal and calculating a mean square voltage value for the measured voltage signal.

In a still further possible embodiment of the method according to the first aspect of the present invention, calculating the capacitance of the AC capacitor further comprises calculating a root mean square DC free quadrature current value for the current as a square root of the difference between the calculated mean square quadrature current value and the square value of the average quadrature current value.

In a still further possible embodiment of the method according to the first aspect of the present invention, calculating the capacitance of the AC capacitor further comprises calculating a root mean square DC-free voltage value for the voltage as a square root of the difference between the calculated root mean square voltage value and the square value of the calculated average voltage value.

In a still further possible embodiment of the method according to the first aspect of the present invention, the capacitance of the AC capacitor is calculated as a ratio between the root mean square DC-free quadrature current value and the root mean square DC-free voltage value and stored in a local storage of the inverter. The data can be stored in the local storage of the inverter until the data is transferred to an external storage or cloud server.

In a further possible embodiment of the method according to the first aspect of the present invention, an automatic compensation of the capacitance of the AC capacitor is performed if a capacitance calibration has been activated by a remote cloud server or by a user via a user interface of the inverter.

In a further possible embodiment of the method according to the first aspect of the present invention, an automatic compensation of the capacitance of the AC capacitor is performed automatically before each inverter start-up and/or performed manually.

In a further possible embodiment of the method according to the first aspect of the present invention, the observed change of the capacitance of the AC capacitor over time is compensated by adjusting the AC current generated by the inverter for the respective electrical power supply phase to optimize a reactive current injection during a power feed-in by the inverter via a closed grid relay into the public or stand-alone power supply grid.

The invention provides according to the second aspect of the present invention, a single or multiphase inverter used for injection of electrical power into a public power supply grid or into a stand-alone power supply grid wherein said inverter comprises a processor adapted to perform the computer-implemented method according to the first aspect of the present invention.

In a possible embodiment of the inverter according to the second aspect of the present invention, for each electrical power supply phase, a current sensor adapted to measure the current signal and a voltage sensor adapted to measure the voltage signal is provided.

In a further possible embodiment of the inverter according to the second aspect of the present invention, the inverter further comprises a communication interface for communication with a remote cloud server and/or a user interface adapted to display the calculated capacitance of the AC capacitor and/or to set parameters of the inverter and being linked to the inverter or integrated in said inverter.

In a still further possible embodiment of the inverter according to the second aspect of the present invention, the inverter comprises at least one DC input to receive electrical DC current generated by at least one DC source. The DC source can include at least one photovoltaic panel, a battery or any other DC current generator.

In the following, possible embodiments of the different aspects of the present invention are described in more detail with reference to the enclosed figures.

DETAILED DESCRIPTION OF EMBODIMENTS

Figure 1:
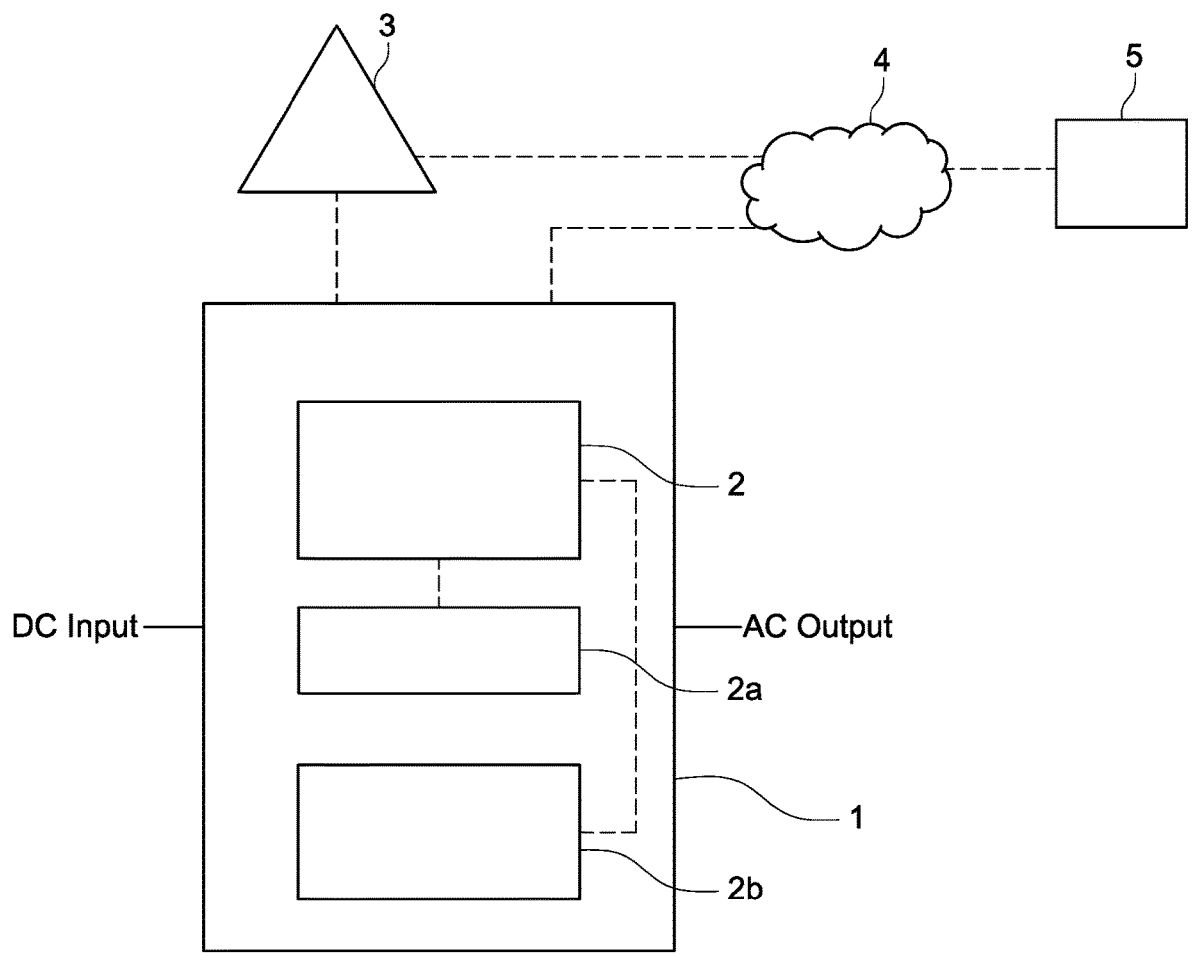
FIG. 1 shows a block diagram for illustrating a possible exemplary embodiment of a single or multiphase inverter according to an aspect of the present invention.

FIG. 1 shows a diagram for illustrating a system configuration of a system comprising an inverter 1 according to an aspect of the present invention. The inverter 1 can comprise a single or multiphase inverter. The inverter 1 comprises a DC side to receive a DC voltage from one or several DC voltage sources. The inverter 1 further comprises an AC side to output an AC voltage which can be supplied to a public power supply grid or to a stand-alone power supply grid or to a backup system. The inverter 1 comprises a processor, in particular a microprocessor 2, which is adapted to perform a computer-implemented method for improving the operational behavior of the inverter 1.

As illustrated schematically in FIG. 1, the inverter 1 can be connected on the AC side to an AC output, for example, a public power supply grid or a stand-alone power supply grid. It may also be connected on the AC side to a backup load or to an AC generator. Further, the inverter 1 can be connected on the AC side to a general AC output. On the DC side, the inverter 1 can be connected to at least one of a DC input, for example, a DC voltage generator, one or more photovoltaic panels or one or more batteries.

In a preferred embodiment, the inverter 1 comprises a user interface 3 as illustrated in FIG. 1. The user interface 3 can be integrated in the inverter 1. In an alternative embodiment, the user interface 3 can be integrated in a separate user interface unit which is linked to the inverter 1, in particular via a wireless or wired communication link. Further, the inverter 1 can be connected via a data network 4 to a remote server 5 as illustrated schematically in FIG. 1. The server 5 may also comprise an artificial intelligence module adapted to perform machine learning ML. The user interface 3 can be integrated in a mobile device such as a smartphone or a tablet. Further, the user interface 3 can also be integrated in a PC terminal equipment connected to the inverter 1 either directly or via a local area network or via the internet. The user interface 3 can be integrated in a client of a private customer or a company, in particular the power supply grid operator. File and/or data transfer between the microprocessor 2 of the inverter 1 and the remote server 5 can be performed according to predefined data transfer protocols. The inverter 1 comprises on the AC side an integrated AC filter 7 having one or more AC capacitors as also illustrated in the circuit diagrams of FIGS. 2, 3. The inverter comprises a display 2a and a DC-AC converter 2b as shown in FIG. 1.

Figure 2:
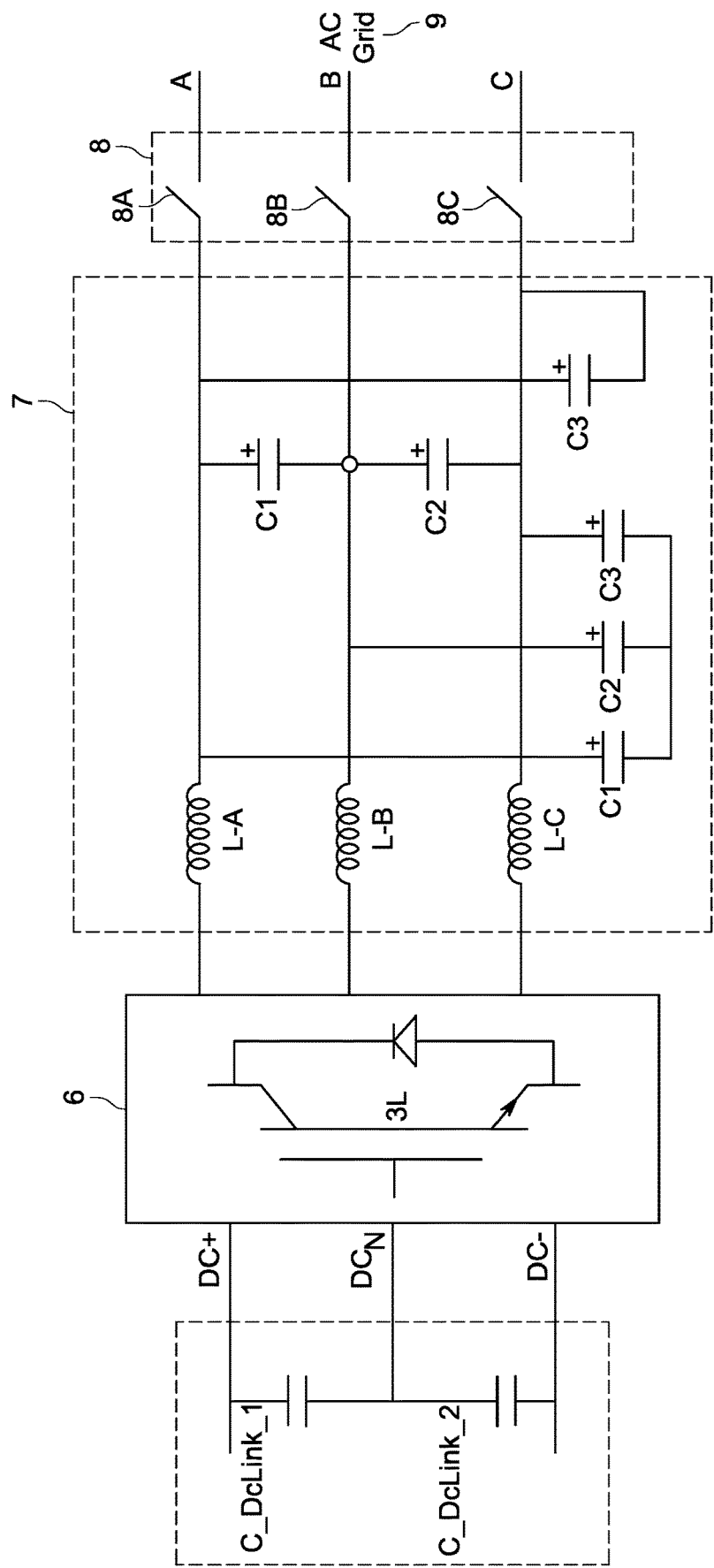
FIG. 2 shows a circuit diagram for illustrating a possible exemplary embodiment of an inverter according to the present invention.

FIG. 2 illustrates a circuit diagram of a three-phase inverter 1 having an AC bridge 6 for three power supply phases. The AC bridge 6 is connected via an AC filter 7 and a grid relay 8 to an AC grid 9. The three power supply phases A, B, C are connected via coils $L_A$, $L_B$, $L_C$ and three contacts 8A, 8B, 8C to the three power supply phases A, B, C of the AC grid 9. The AC grid 9 can be a public power supply grid or a stand-alone power supply grid such as a microgrid or a backup system.

The microprocessor 2 of the inverter 1 is adapted to perform a computer-implemented method comprising two main steps. In a first main step, a capacitance C of an AC capacitor of said inverter 1 for each electrical power supply phase of the inverter 1 is calculated on the basis of a measured voltage signal and a measured current signal for the respective electrical power supply phase A, B, C during a startup of the inverter 1 when the inverter 1 is separated by the grid relay 8 from the AC grid 9 which may comprise a public or a stand-alone power supply grid or a backup system.

In a further main step, an observed change of the capacitance C of the AC capacitor over time is compensated by adjusting the AC current generated by the inverter 1 for the respective electrical power supply phase to optimize a reactive current injection. In a preferred embodiment, the observed change of the capacitance C of the AC capacitor over time is compensated by adjusting the AC current generated by the inverter 1 for the respective electrical power supply phase to optimize the reactive current injection during a power feed-in by the inverter 1 via the closed grid relay 8 into the AC grid 9. Accordingly, the microprocessor 2 of the inverter 1 performs an AC capacitor auto calibration algorithm during operation of the inverter 1 to improve its operational behavior. In a possible embodiment, the use of the AC capacitor auto calibration algorithm in a multi-phase, in particular three-phase, inverter 1 as illustrated in FIG. 2 does entail a concept simplification of treating the respective inverter 1 as three separate single-phase inverters wherein each single-phase inverter 1 is provided for an associated power supply phase. The computer-implemented method can separately use the AC voltage and AC current signals from each power supply phase to estimate the total capacitor value C of every single power supply phase. This concept simplification also allows the use of sensor values independent from the position of the sensors used for current measurement. The three measured values (one per phase) comprise capacitance values C of an equivalent global star or delta bank of capacitors according to a configuration of the AC voltmeters being present in the inverter 1 phase-to-neutral or phase-to-phase, respectively. The configuration is not relevant to the performed calculations as the computer-implemented method according to the present invention can operate independently from the configuration providing automatically a capacitance C of the AC capacitors in the respective configuration (star or delta) used in the individual inverter 1 as long as the capacitor voltages and capacitor currents can be measured and/or calculated and are available to the microcontroller 2 of the inverter 1.

Figure 3:
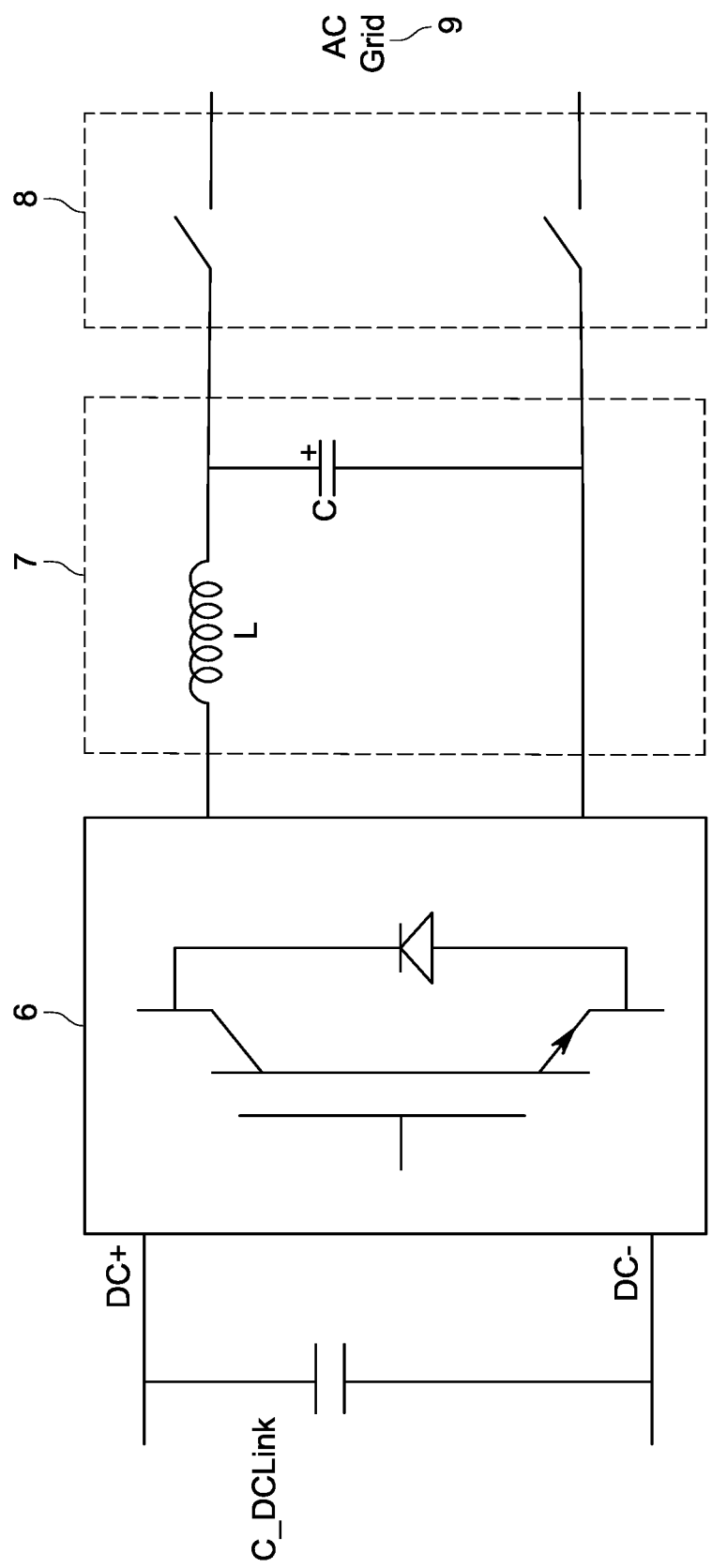
FIG. 3 shows a further electrical diagram for illustrating a possible exemplary embodiment of an inverter according to the present invention.

FIG. 3 shows the electrical diagram for a single-phase inverter 1 having a single power supply phase connectable by means of a grid relay 8 to the AC grid 9.

Figure 4:
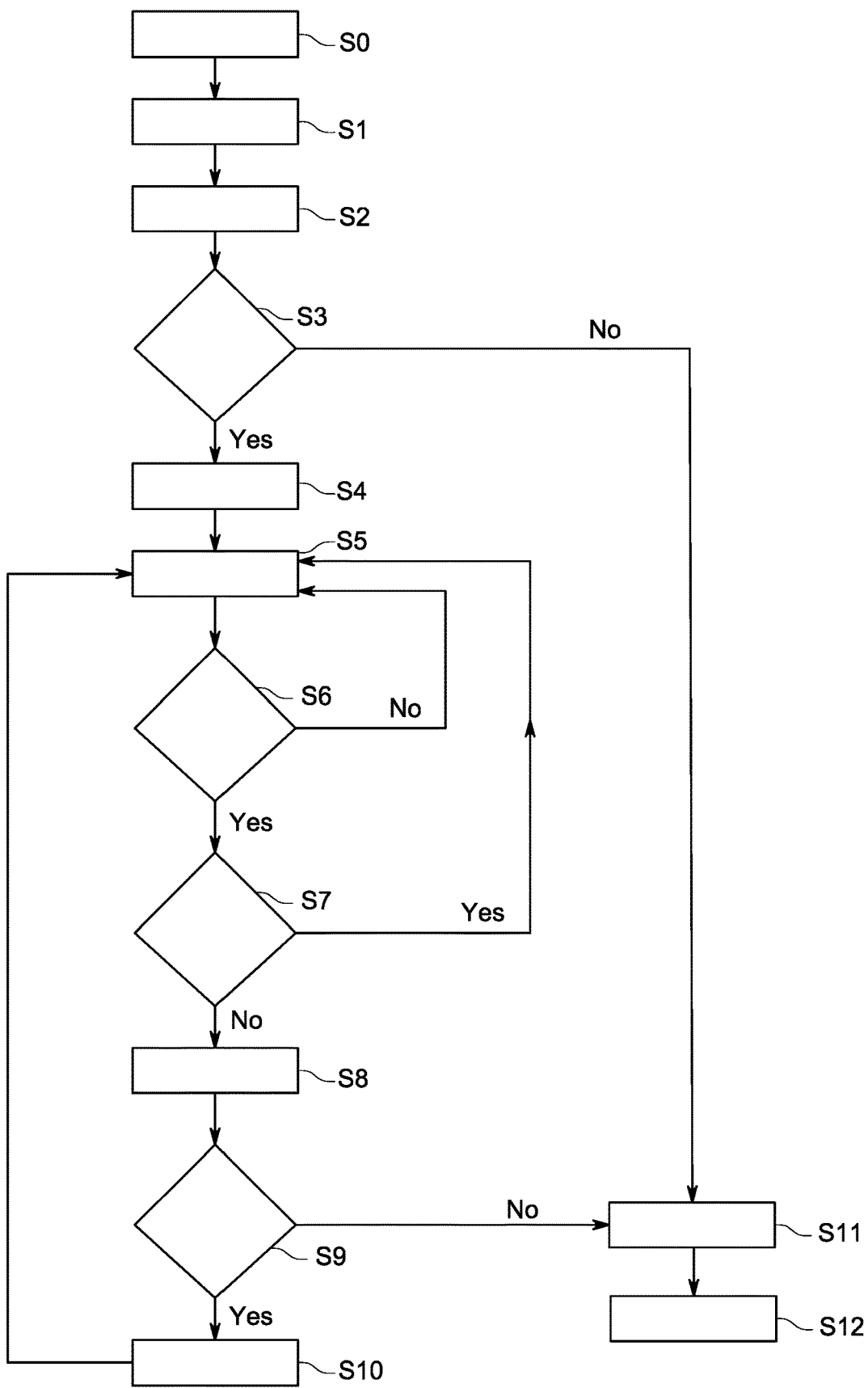
FIG. 4 shows a flowchart of a possible exemplary embodiment of a method according to an aspect of the present invention.

FIG. 4 illustrates a flow diagram of a possible exemplary embodiment of a computer-implemented method for improving an operational behavior of an inverter 1 according to a first aspect of the present invention.

In a first step S0, a startup of the inverter 1 is performed.

In a following step S1, a capacitance C of an AC capacitor of the AC filter stage 7 of the inverter 1 for each electrical power supply phase of the inverter 1 is calculated on the basis of a measured voltage signal U and a measured current signal I for the respective electrical power supply phase following directly the inverter 1 startup in step S0 or performed during the startup of the respective inverter 1. The calculation of the capacitance C of the AC capacitor is performed when the inverter 1 is separated from the public or stand-alone power supply grid 9, in particular by switching off the grid relay 8. The capacitance C of the AC capacitor for each electrical power supply of the inverter 1 can be calculated by the processor 2 of the inverter 1 on the basis of a predefined minimum number of voltage signal samples and current signal samples.

In a following step S2, the calculated capacitance C of the AC capacitor can be stored in an internal memory or in an external memory, in particular in a cloud memory. In a possible embodiment, the calculated capacitance C of the AC capacitor and an associated measured ambient temperature T can be stored in a local or remote database. Furthermore, a C-T-curve fitting (interpolation or extrapolation) is done in this stage, to later map the real time temperature T to the relevant estimated capacitance C, using this C(T)curve. It is also possible to store a C(H,T) curve or a C(H,T,t) curve in step S2 taking into account humidity H and time t.

In a step S3 it is checked whether the calculated capacitance C of the AC capacitor is in an admissible range between a minimum capacitance and a maximum capacitance.

If the calculated capacitance is within the admissible range, necessary corrections in the controller gains are performed to optimize the reactive power injection in step S4.

In a further step S5, a feed-in of electrical power by the inverter 1 is started, in particular after having closed the grid relay 8.

In a further step S6, it can be checked whether online capacitance calibration has been activated or not. The capacitance calibration can be activated by a remote cloud server 5 or by a user via the user interface 3 of the inverter 1.

When the capacitance C of the AC capacitor has been calculated in step S1, the ambient temperature T can also be stored along with in step S2. Further a momentary humidity H and a time stamp t can be stored. So, for example if in the morning the ambient temperature T is colder than during noon, this can affect the capacitance value C of the AC capacitor. To compensate for that, after the feed-in in step S5, an additional step S7 can be included, where it is checked in step S7 whether the temperature value T is inside or outside a predefined tolerance band. If the temperature T is not within the predefined tolerance range the capacitance value C of the AC capacitor is estimated from the stored C (T, H, t) curve in step S8. In step S7 it is checked whether the temperature T is inside or outside an admissible temperature range. If not, the process proceeds with mapping step S8. Otherwise, the process loops back to the feed-in step S5 as illustrated in the flowchart of FIG. 4.

If online capacitance calibration has been activated as checked in step S6 and if the temperature T is found to be outside the predefined admissible temperature range, mapping of the real-time capacitance of the AC capacitor is performed in step S8 based on a C(T)curve, a C(T,H) curve or based on a C(T,H,t) curve stored in step S2. In step S8 a real-time capacitance is estimated based on the stored curve.

During the feed-in, the capacitance value C of the AC capacitor can be estimated not only based on temperature T, but also depending on the age or operation lifetime of the AC capacitor. This can be taken from an inter/extrapolated curve. In this way, the age factor is also taken into account. The temperature value T also can be a seasonal parameter. For example, in the month of May, this factor can be different from January. This new dependency over time, can come into effect after a minimum predefined numbers of days, for example after 90 or 180 days, depending on the installed region where the inverter 1 is installed, when enough weather conditions have been experienced by the inverter 1.

In a further possible embodiment, since in many inverters, a humidity sensor is also embedded along with an internal temperature sensor, humidity H can also be used as another parameter to even make more precise estimation of the C-value depending on the site conditions and different weathers.

In a further step S9, it is checked whether the mapped capacitance C of the AC capacitor is within a predefined tolerance range, i.e., between a minimum capacitance value $C_{min}$ and a maximum capacitance value $C_{max}$. If the mapped capacitance C of the AC capacitor is not within the predefined tolerance range, the inverter 1 is automatically shut down in step S12 after information about the defective capacitor has been sent to a webserver or output via a user interface with a state code/warning in step S11. A warning message can be sent by the processor 2 of the inverter 1 in step S11 to a remote server 5 or output to a user via a user interface 3 of the inverter 1 in step S11. The warning message may indicate that the AC capacitor is defective. The user interface 3 of the inverter 1 may comprise an LCD display, an augmented reality AR interface or a virtual reality VR interface unit. The user interface unit 3 may comprise a light-emitting diode LED to output a warning message. Further, the display of the user interface 3 may output a text message indicating the warning message and/or the capacitance value C of the AC capacitor found to be defective. In further implementations, the warning message may also be output via a loudspeaker as an audio message. After the warning message has been output in step S11, the inverter 1 can be shut down in step S12. In contrast, if the calculated capacitance value C of the AC capacitor is found to be in a predefined admissible range in step S9, an observed change of the capacitance C of the AC capacitor is compensated in step S10 as illustrated in the flow diagram of FIG. 4. The controller 2 of the inverter 1 performs the necessary corrections to optimize reactive power injections into the public or stand-alone power supply grid or to a backup system by the inverter 1. Accordingly, in step S10, the observed change of the capacitance C of the AC capacitor over time can be compensated in step S10 by adjusting the AC current generated by the inverter 1 for the respective electrical power supply phase to optimize a reactive current injection. The optimization of the reactive current injection can be performed by adjusting the reactive current injection, i.e., the reactive power injection into the power supply grid 9 based on the new capacitance value. After step S10 has been performed, the process loops back to step S5 as illustrated in the flowchart of FIG. 4.

The two main steps of the process illustrated in FIG. 4 comprise the calculation of the capacitance C of the AC capacitor in step S1 and the automatic compensation of the observed change of the capacitance C in step S10.

Figure 5:
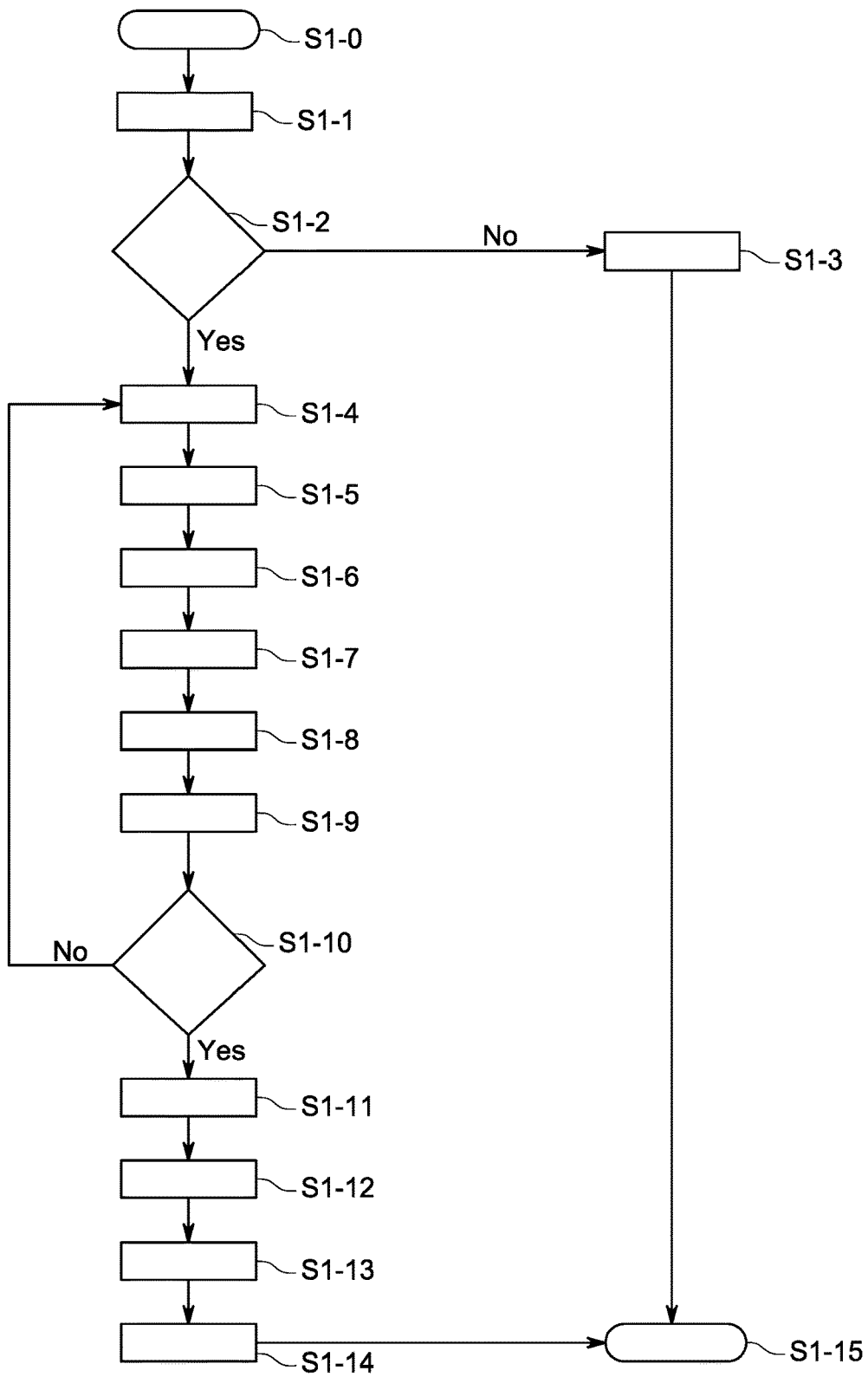
FIG. 5 shows a further flowchart for illustrating a calculation of a capacitance of an AC capacitor performed during the execution of a computer-implemented method according to the first aspect of the present invention.

FIG. 5 shows a possible implementation of the calculation of the capacitance C of the AC capacitor as in step S1 of FIG. 4. Capacitance calculation in step S1 as illustrated in FIG. 4 can be performed during the startup phase (as shown in FIG. 4 —steps S0-S5) of the inverter 1. During the startup phase, calculations can be performed and updated in real time and simultaneously with the sampling and measuring operation.

In other words, when the period of measuring is completed, the value of the capacitance C of the AC capacitor is calculated instantaneously, thereby eliminating any additional time required for capacitance calculation.

At step S1-0, a power checkup is initiated. During the power checkup, the microprocessor 2 waits in step S1-1 until a transient response phase of the AC bridge is completed. In other words, the microprocessor 2 waits in step S1-1 until a steady state is reached. Transient response comprises the electrical current as response to a voltage signal output by the inverter 1.

Then, it is checked in step S1-2 whether the inverter 1 has reached a steady state. If this is not the case, then a relevant state code can be displayed in step S1-3 on a user interface 3 of the inverter 1. In other words, it indicates that the inverter has a problem and does not reach the steady state. The associated state code with the problem is displayed.

When the steady state has been reached by the inverter 1, the calculation of the capacitance value C of the AC capacitor is initiated. The capacitance C of the AC capacitor for each electrical power supply of the inverter 1 is calculated by the processor 2 of the inverter 1 on the basis of a predefined number of voltage signal samples and current signal samples. The voltage and current signals could be stored for the duration of the calculation in an internal memory or an external memory, in particular in a cloud memory. After having measured the voltage signal and the current signal in Step S1-4, a quadrature current signal is calculated using an integral of the measured current signal in step S1-5. Based on the calculated quadrature current signal, an average quadrature current value is calculated in step S1-6 as shown in FIG. 5. In a further step S1-7, a mean square quadrature current value is calculated for the calculated quadrature current signal.

In a further step S1-8, an average voltage value is calculated using the integral of the measured voltage signal. Then, a mean square voltage value is calculated in step S1-9 based on the measured voltage signal as shown in the flowchart of FIG. 5. It can be checked whether enough samples have been provided in step S1-10. In a possible implementation, at least three to four periods of the measured voltage and current signal are used for calculating the mean square quadrature current value and the mean square voltage value. If enough samples are provided in step S1-10, then the microprocessor 2 returns to the step S1-4.

In a further step S1-11, calculation of the capacitance C of the AC capacitor illustrated in FIG. 5 comprises the calculation of a root mean square DC free quadrature current value for the electrical current as a square root of the difference between the square value of the calculated root mean square quadrature current value and the square value of the average quadrature current value. Further, a root mean square DC free voltage value for the voltage is calculated in step S1-12 as a square root of the difference between the square value of the calculated root mean square voltage value and the square value of the calculated average voltage value. Finally, the capacitance C of the AC capacitor is calculated in step S1-13 as a ratio between the root mean square DC free quadrature current value and the root mean square DC free voltage value and stored in a local storage of the inverter 1 or in an external remote storage of a data cloud for future analysis in case of any malfunction occurring in the inverter 1. The calculated estimated capacitance C of the AC capacitor can be displayed via a user interface 3 of the inverter 1 or via an interface of a remote server 5 in step S1-14. The following automatic compensation can be performed on the basis of the calculated estimated capacitance value C of the AC capacitor. In a possible embodiment, the calculated capacitance C of the AC capacitor is stored in step S2 as illustrated in FIG. 4 along with a measured ambient temperature T and possible other parameters in the local internal memory or in the remote external memory for further processing. In the following steps as illustrated in the flowchart of FIG. 4, an automatic compensation of an observed change of the capacitance C of the AC capacitor over time can be performed by adjusting the AC current generated by the inverter 1 for the respective electrical power supply phase. In a possible embodiment, the current value of the capacitance C of the AC capacitor is estimated based on a measured real-time temperature T inside the inverter 1 and/or humidity H in step S8 in particular by performing mapping. In a possible embodiment, the capacitance value C of the AC capacitor can be calculated or estimated every couple of minutes or hours per day under different loading and temperature conditions and/or humidity conditions. If the mapped capacitance value C of the AC capacitor is in a predefined range, the controller or processor 2 of the inverter 1 can perform the necessary actions to optimize in step S10 the reactive power injection of the electrical power into the respective grid. If the mapped capacitance value of the AC capacitor is out of range, then the inverter 1 can be automatically stopped and a corresponding message and state code can be sent in step S11 to a remote server. This message can provide a warning and require to repair the affected inverter 1. In a possible embodiment, if the calculated capacitance C of the AC capacitor is not within the predefined tolerance range, an automatic switchover to a redundant AC capacitor can be triggered automatically by the processor 2 of the inverter 1. This may reduce the efforts required for repair or maintenance activities at the side of the inverter 1 located in the field.

In a possible embodiment, the calculated capacitance C of the AC capacitor and the associated measured ambient temperature T stored in the local memory or in the database of the cloud server 5 can be interpolated by an artificial intelligence module. The interpolation can be performed to predict the operational behavior of the AC capacitor for various ambient temperatures T and/or for the remaining operation lifetime of the AC capacitor and/or fault classes of the AC capacitor. In a possible embodiment, a predictive maintenance operation can be triggered automatically by the cloud server 5 in response to a predicted operational behavior and/or a predicted operation lifetime of the AC capacitor and/or predicted fault classes of the respective AC capacitor. In this way, a continuous fault-free operation of the inverter 1 can be achieved.

In a possible embodiment, a capacitance C and a temperature curve (CT-curve) based on measured capacitance data and temperature data can be provided and used for classification and machine learning ML purposes. Also, other parameters such as humidity H and age (time of operation) can also be added for more precise estimation in ML or mathematical regression methods.

Figure 6:
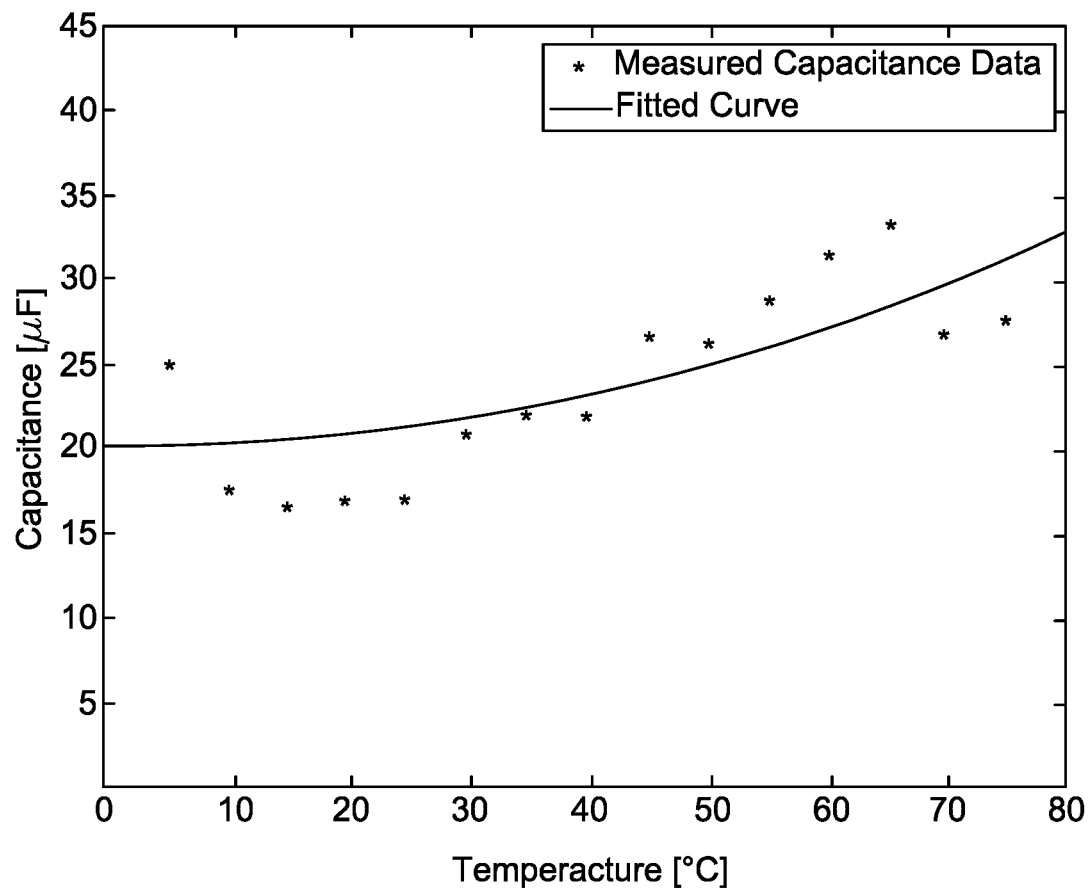
FIG. 6 shows a diagram for illustrating an interpolation of a capacitance C vs temperature T performed in a possible embodiment of the computer-implemented method according to the present invention.

FIG. 6 illustrates measured values of a capacitance C of the AC capacitor for different ambient temperatures T and a fitted curve based on the values. The curve can be fitted by means of machine learning ML or regression etc. The behavior of the AC capacitor with various temperatures T can be predicted based on the measured data. For instance, a function like C(T) can be estimated using machine learning ML after enough measurement data has been transmitted to the remote cloud server 5. The interpolation (curve fitting) can be done also with other available methods like regression, and can be done locally in the microprocessor 2, or be done externally in the cloud server 5.

Even if the data from the manufacturer of the inverter 1 and data from the manufacturer of the AC capacitor are not available (such as type, curves, etc.), a good estimation of the capacitance C can still be achieved via machine learning ML over time. It makes the estimation even more accurate and the function can be calculated based on more parameters such as the age of the capacitor: C(T,age).

Moreover, it is possible to classify defective capacitors via machine learning ML, in particular when the value of the capacitance C of the AC capacitor has a large drift with respect to the expected value. In this case, normally the values do cluster together based on a type of the defect, caused by several factors such as, e.g., aging, bad insulation, freezing, loose connection, etc.

Figure 7:
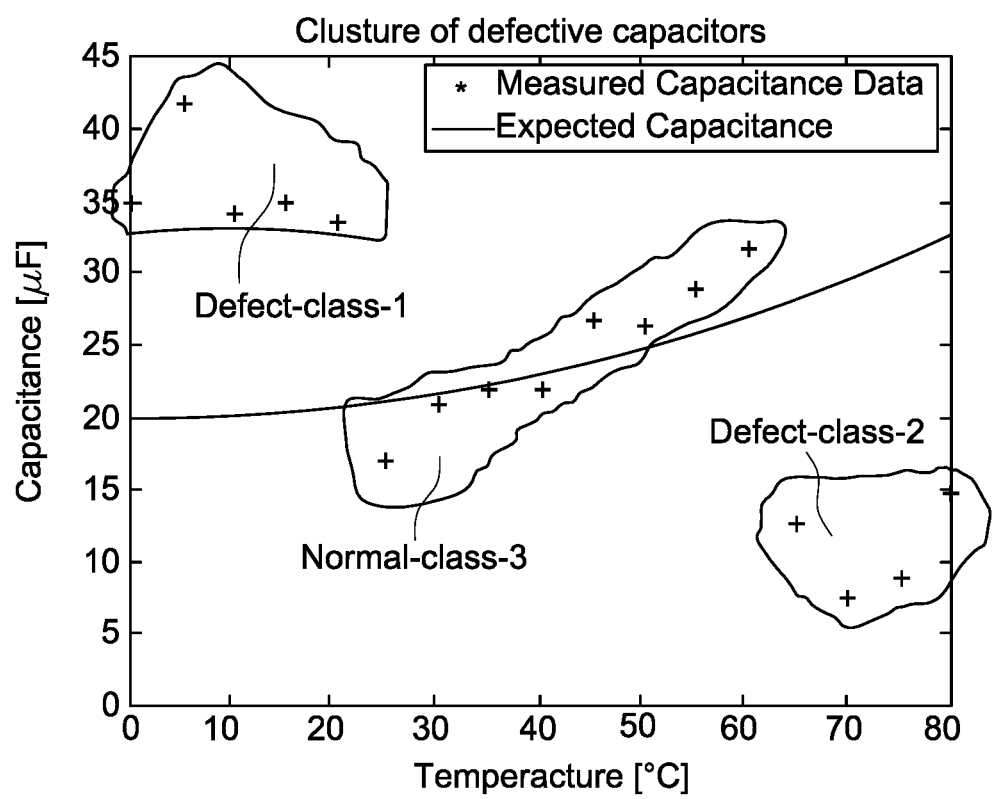
FIG. 7 shows a further diagram for illustrating a classification performed by an artificial intelligence module when performing a computer-implemented method according to the present invention in a possible embodiment.

FIG. 7 shows a diagram for illustrating a possible classification based on measured capacitance data and an expected capacitance C. In this way, it is possible to indicate a fault of the AC capacitor for the purpose of predictive maintenance using classification as illustrated in FIG. 7.

Figure 8:
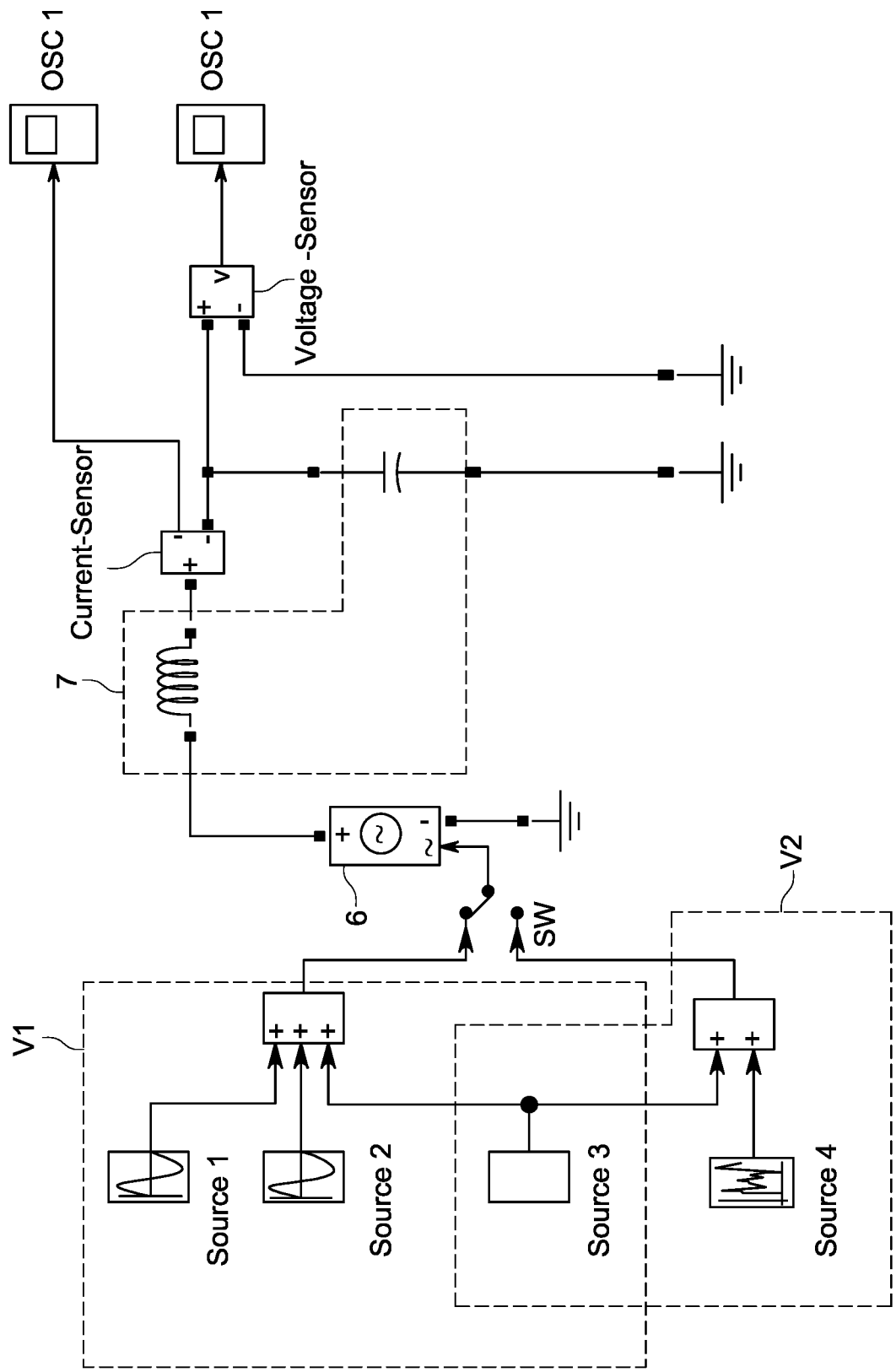
FIG. 8 shows a diagram for illustrating a simulation model which can be used to simulate the method according to the present invention.

FIG. 8 illustrates a Simulink model which can be used to perform simulations of the AC stage (represented by 6 and 7 in FIG. 3) of an inverter 1. The illustrated Simulink model of FIG. 8 consists of two selectable voltage sources (V1 and V2) which can be used to evaluate a robustness of the proposed computer-implemented method according to the present invention. The Simulink model further models an inverter bridge 6 and an AC filter 7 of the inverter 1. Further, oscilloscopes (OSC1 and OSC2) are illustrated to demonstrate the test setup provided by the Simulink model of FIG. 8. A manual switch SW can be provided to select between the two voltage sources, V1 and V2, to provide two different test cases. The source can be selected by the manual switch SW illustrated in FIG. 8. As a benchmark, two different voltage signals can be selected. The computer-implemented method according to the present invention can be used to improve an operational behavior of the inverter 1 independent of any signal form. In the illustrated example, in a first test case, an inverter bridge receives a fundamental frequency (Source 1), e.g., a frequency f=50 Hz and a voltage of e.g., 308V peak plus a harmonic (Source 2), e.g., a fifth harmonic at a frequency f=150 Hz and a voltage=200$V_p$ plus a DC injection from a constant voltage source (Source 3, e.g. 100V). When the manual switch SW is switched to the other test case, the inverter bridge of the inverter 1 receives a constant DC voltage from the constant voltage source (Source 3, e.g., 100V) and a white noise signal (Source 4, voltage=300$V_p$). A current flows through the coil L and a current sensor to an AC capacitor C whose voltage is measured by the voltage sensor. The current measured by the current meter and the voltage measured by the voltage sensor can be displayed on a display of a corresponding oscilloscope OSC as illustrated in the setup of FIG. 8.

Figure 10A:
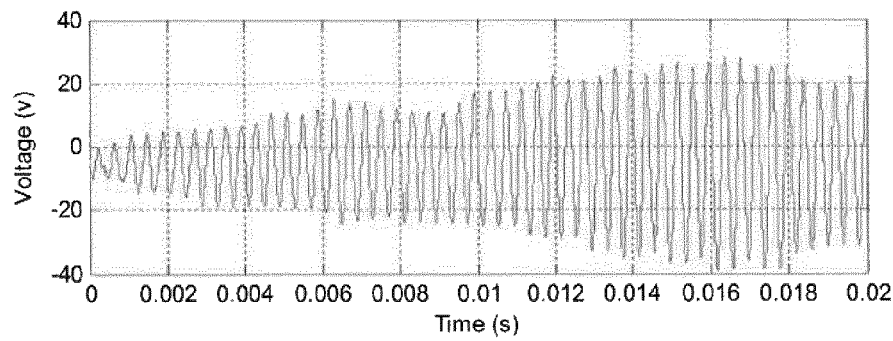
FIGS. 10A-10D show voltage and current signals to illustrate the operational behavior of an inverter during a startup according to the present invention using a simulation data model.
Figure 10B:
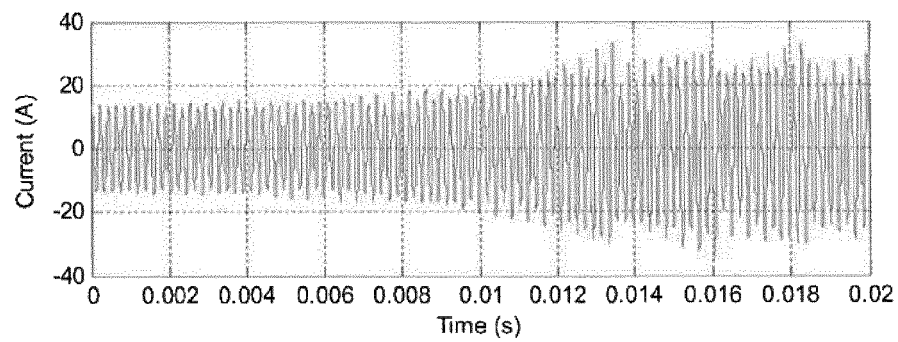
Figure 10C:
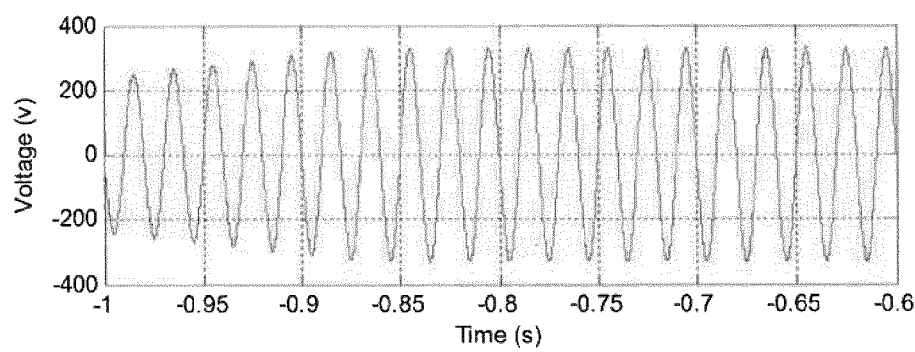
Figure 10D:
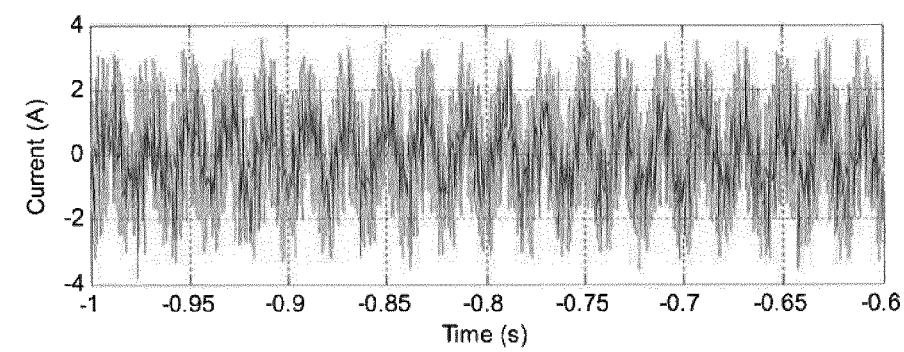

FIGS. 10A, 10B illustrate the voltage and current signals for the Simulink model illustrated in FIG. 8. Also, FIGS. 10C, 10D exemplary illustrate the voltage and current signals for a Hardware-in-the-Loop HiL simulation.

Figure 11A:
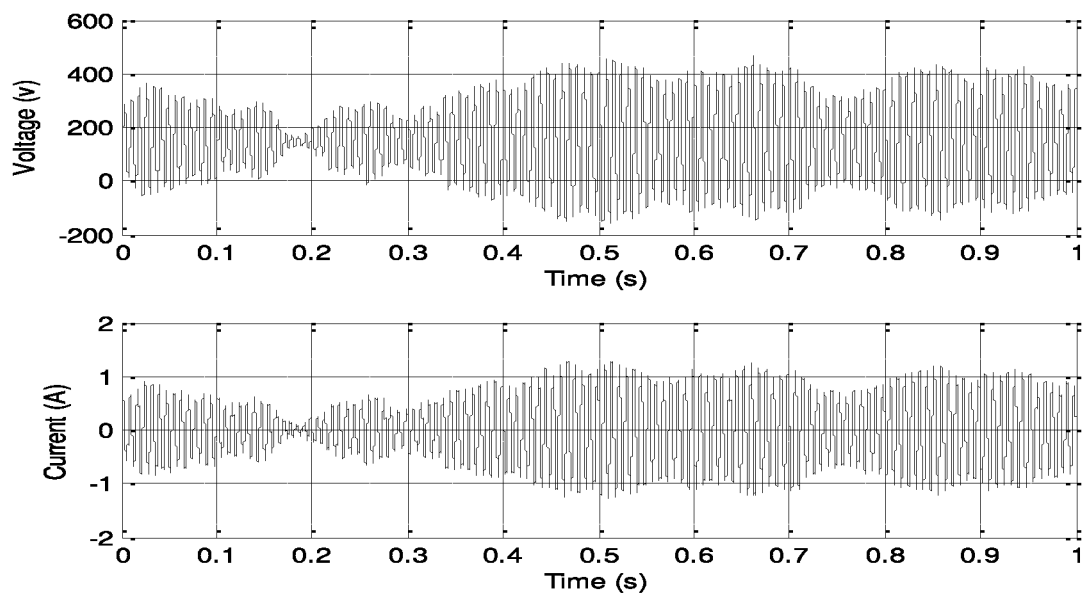
FIGS. 11A-11D show voltage and current signals to illustrate the operational behavior of an inverter according to the present invention using a simulation data model.
Figure 11B:
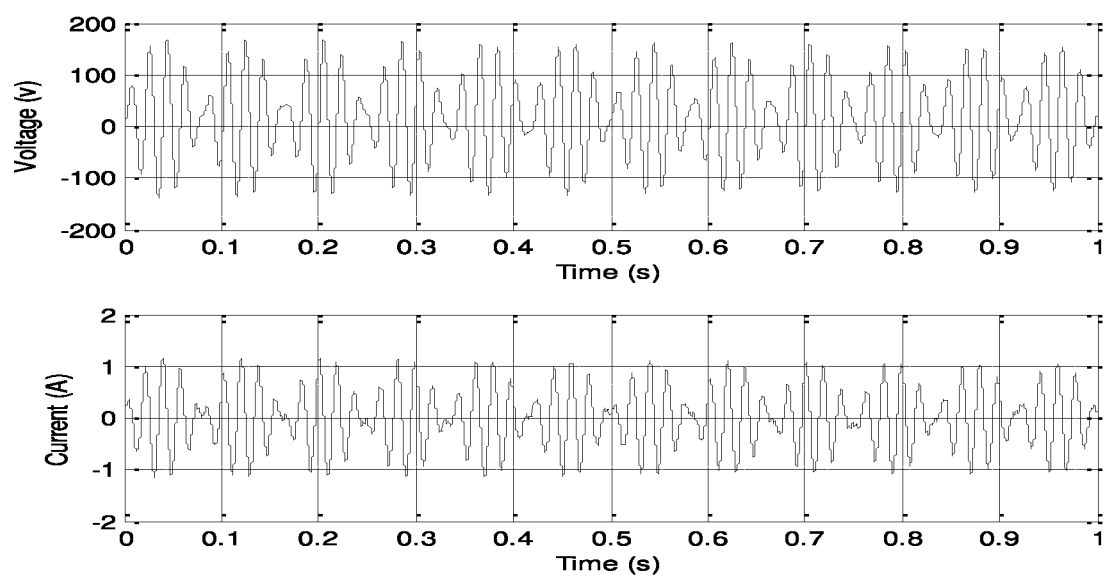
Figure 11C:
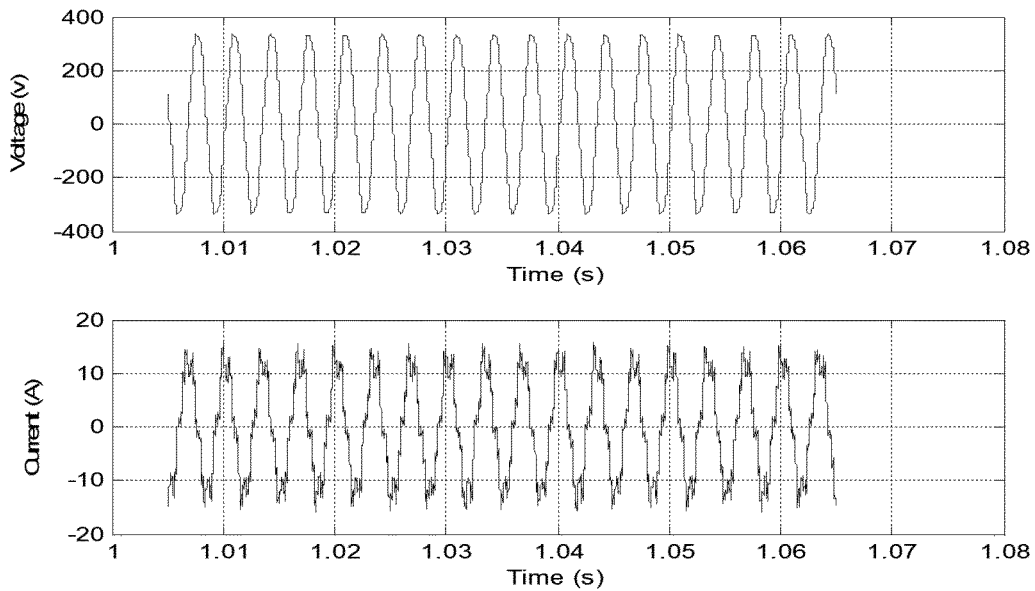
Figure 11D:
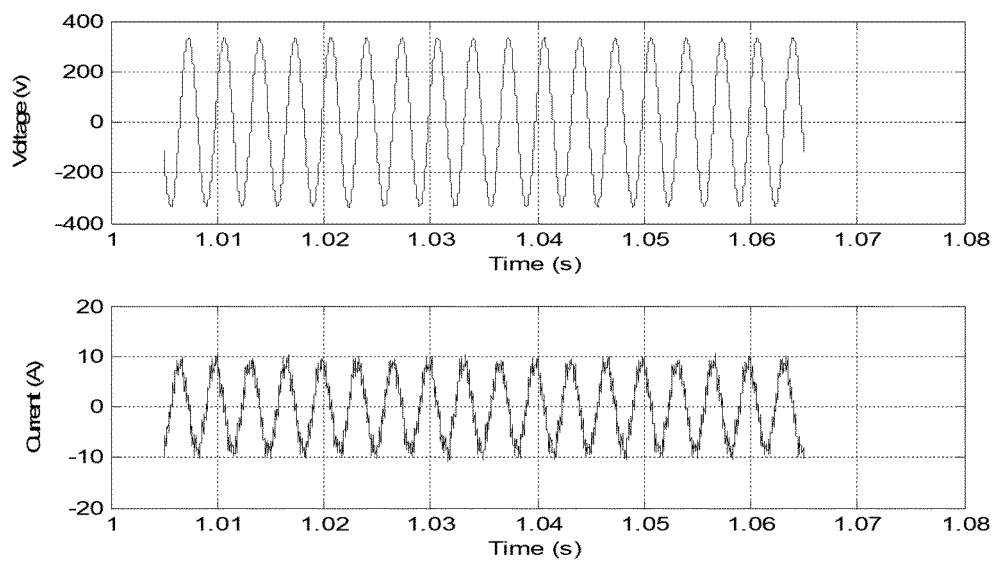

FIGS. 11A, 11B show further voltage and current signals or waveforms which can be used to calculate a capacitance C of an AC capacitor using the Simulink model of FIG. 8. For instance, for a real capacitance value of 22 µF (as in FIG. 11A) for the AC capacitor, the calculated estimated capacitance C is calculated by the calculation process as illustrated in FIG. 5 and is 22.0019 µF. For a real capacitance C of the AC capacitor of 5 µF (as in FIG. 11B), the calculation procedure of FIG. 5 yields a calculated capacitance value of 5.0050 µF according to the Simulink model. The first test-case (22 µF) is simulated using a combination of a random voltage signal plus a DC signal injection. The second test case (5 µF) is simulated with a combination of a fundamental voltage signal plus harmonic signals plus a DC signal injection. Therefore, via these two test cases, the robustness of the proposed algorithm is proved, since it works both for a wide range of capacitances and also wide range of input signal types. Consequently, the calculation of the estimated capacitance C of the AC capacitor is very accurate. Instead of the Simulink model illustrated in FIG. 8, other simulation models can be used as well, for instance a HiL model. FIGS. 11C, 11D show further voltage and current signals or waveforms which can be used to calculate a capacitance C of an AC capacitor using the HiL simulation. For instance, for a real capacitance value of 19.4 µF for the AC capacitor (as in FIG. 11C), the calculated estimated capacitance C is calculated by the calculation process as illustrated in FIG. 5 and is 19.5076 µF. For a real capacitance C of the AC capacitor of 13.4 µF (as in FIG. 11D), the calculation procedure of FIG. 5 yields a calculated capacitance value of 13.5024 µF according to the HiL simulation.

Figure 9:
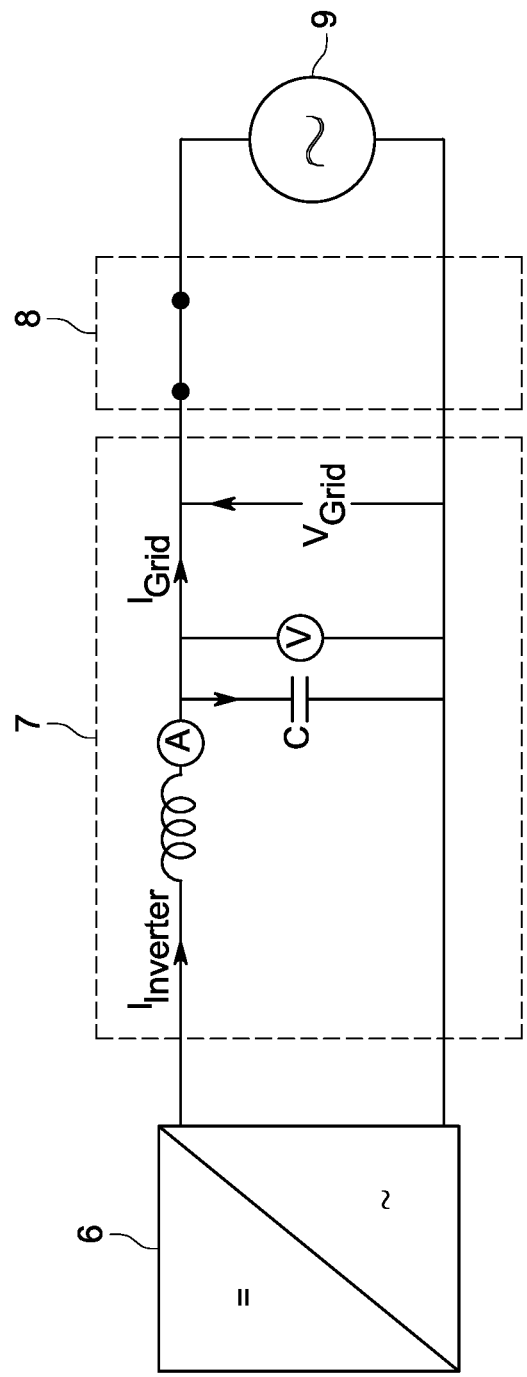
FIG. 9 shows a circuit diagram for illustrating the operation of a computer-implemented method according to the present invention.

FIG. 9 shows a further diagram for illustrating the operational behavior of the inverter 1 according to the present invention. To calculate the electrical current that the inverter 1 can inject into the power supply grid 9 it can be calculated for the power stage of the inverter 1 as follows:

Current injected to the grid=total current generated by the inverter 1−current taken by the AC capacitor.

Since as illustrated in FIG. 9 there is only one current sensor, the capacitor current flowing to the AC capacitor can be calculated using the voltage sensor connected in parallel to the AC capacitor as illustrated in FIG. 9.

Accordingly, $I_{cap(initial)} = V_{grid}/(jC_0\omega)$, wherein the current of the AC capacitor forms a reactive current type. Initial means here that the AC capacitor has not yet been changed in contrast to "new" which indicates that a change in the capacitance value C has already occurred. Accordingly, by knowing the voltage V and the capacitance C of the AC capacitor, the electrical current can be calculated (and not measured) as follows:

$$I_{grid(initial)} = I_{inverter(initial)} - V_{grid}/(jC\omega).$$

If all parameters of the equation are known under normal conditions without a capacitor drift, the inverter 1 can adjust the phase and amplitude of the inverter current $I_{inverter}$ in such a way that the phase shift added by the capacitor current $I_{cap}$ can be cancelled and no unwanted reactive current is injected into the power supply grid 9.

However, if the capacitance C of the AC capacitor changes over time, for instance with a drift of ΔC, this consequently leads to a drift of the electrical current of the AC capacitor:

$$I_{cap(new)} = V_{grid}/(j(C_0 + \Delta C)\omega) = I_{cap(initial)} + \Delta I_{cap}$$

If the controller or processor 2 of the inverter 1 is not aware of this change in the capacitance C of the AC capacitor and generates the same electrical current as previously, this does lead to an unwanted reactive current injection into the power supply grid 9 as follows:

$$I_{grid(new)} = I_{inverter(initial)} - I_{cap(initial)} - \Delta I_{cap} = I_{grid(initial)} + \Delta I_{grid}$$

With the method according to the present invention, it is possible that the controller 2 of the inverter 1 recalculates the new value of the capacitance C, and then ΔC and subsequently $\Delta I_{cap}$ can be calculated. Following the drift of the electrical current, the controller 2 of the inverter 1 can take this into account and can generate a new electrical current with an opposite drift:

$$I_{inverter(corrected)} = I_{inverter} + \Delta I_{cap}$$

which yields:

$$I_{grid(new)} =$$
$$I_{invertner(corrected)} - I_{cap(new)} = I_{inverter(initial)} + \Delta I_{cap} - I_{cap(initial)} - \Delta I_{cap} =$$
$$I_{inverter(initial)} - I_{cap(initial)} = I_{grid(initial)}$$

Consequently, the grid current remains the same and the unwanted electrical current is removed by the performed countermeasure, i.e., the automatic compensation where an opposite drift current is generated.

It is possible to use the periodic capacitor calculation over day based e.g., on national code limits. The utilization of the AC capacitor autocalibration functionality as provided by the method according to the present invention at any time during the day is possible and does normally not present any negative effect for the public grid stabilization in those cases in which the inverter 1 is grid-connected and the normal reconnection times are in an order of 5 to 10 minutes. In the particular use case of a solar farm or solar power plant comprising a photovoltaic inverter, a synchronization of the provided inverters can be performed to avoid a complete disconnection during the reconnection time. A synchronization of the inverters 1 of the photovoltaic power plant can be provided by programming the inverters 1 in such a way that every single one of the inverters 1 or a combination of the inverters 1 in small groups do accomplish their respective autocalibration in different timeslots. At any given time, only a fraction of the total number of the inverters 1 in the photovoltaic power plant are disconnected from the power supply grid 9 (e.g., only 5 to 10% of the provided inverters).

The AC capacitor autocalibration functionality as provided by the method according to the present invention can reinforce the compliance of national standards that limit and/or regulate the injection of reactive power into the power supply grid 9 for ensuring a minimum quality level of the supplied energy to the grid users. An example of such an important standard that does regulate fix cosPhi/$Q_{AC}$ values just as the cosPhi/$Q_{AC}$ level depending on the power value comprise the German standard VDE-ARN 4105 that requires to fulfil a requirement of an accuracy of $Q_{AC}$=±4% Pe, max(e=errogation) and/or the Australian/New Zealand standard DR AS/NZS 477.2:2020 which limits the cosPhi to values between 0 and 0.8.

A periodic monitoring of the AC filter stage 7 using the AC capacitor autocalibration performed by the method according to the present invention further assures that an injection of reactive power to the public power supply grid 9 by the inverter 1 remains during the productive lifetime of the inverter 1 inside a predefined standard tolerance.

The inverter 1 according to the present invention also provides a possibility of working with a DC source or battery instead of a photovoltaic array. The origin of the DC power applied to the DC side of the inverter 1 does not comprise any restrictions, since the interface between the DC source and the AC bridge form a DC link. Therefore, a small amount of energy needed during the startup of the inverter 1 can be taken from the DC link and not directly from the respective DC energy source. As a consequence, all inverters which have at least one DC input adapted for using a battery can activate an AC capacitor autocalibration procedure without any modification or reconfiguration.

Via the user interface 3 of the inverter 1 or via a communication interface, a server of the operator of the power supply grid 9 can connect to every online inverter 1 and may send commands via a data network to enforce an automatic AC capacitor autocalibration of the respective inverter 1. The controller of the inverter 1 can open the AC grid relays 8 and can restart the inverter feed-in procedure in order to initiate the required AC capacitor autocalibration function. By using the user interface 3 of the inverter 1 or by using a communication interface, it is possible to trigger at any moment an autocalibration function of the respective inverter 1. This implies an improvement for the public grid quality and provides a procedure for remote quality control.

In a scenario where the drift of the capacitance C of the AC capacitor from its initial value is higher than admissible tolerances, performing only corrective or compensation measures by the inverter 1 may not be sufficient because the operation of the inverter 1 can become unreliable. Accordingly, in a possible embodiment, an automatic switchover to another redundant AC capacitor can be performed. In many situations, it is hard to access the installed inverter 1 which can be installed in the field, for instance, at a remote village. In this case, a redundant spare capacitor can be installed in the housing of the inverter 1. By switching a relay, an automatic switchover from the degraded original AC capacitor to the redundant preinstalled AC capacitor can be performed in case that the measured data indicates a degradation of the original AC capacitor over time. In a possible implementation, to prevent a degradation of the redundant capacitor over time, the controller or processor 2 of the inverter 1 can also switch between both of them frequently, for example every two days. Under these conditions, both AC capacitors will have almost the same aging curve. The calculation of the capacitance C of the AC capacitor as illustrated in the flowchart of FIG. 5 has the advantage that it also successfully suppresses the unwanted effects of harmonics calculations by the introduction of quadrature signals, i.e., orthogonal signals. The implementation of the signal is by using an integral of the current signal. Moreover, Parseval's theorem makes it possible to link the frequency and time domain calculation of the energy or RMS of the signal. It is possible to show that the proposed calculations in the time domain do compensate the effects of harmonics in the frequency domain. Consequently, the final calculation of a capacitance C is a ratio between the DC-free root mean square quadrature current value and the DC-free root mean square voltage value and does not have big drifts from the real value due to harmonic effects.

The method according to the present invention can use the existing infrastructure and components of the inverter 1. The method operates on the basis of analyzing the voltage and current signals in a startup stage of the inverter 1 which can be performed before the grid relay 8 has been closed. In this way, the AC filter stage 7 is isolated from the power supply grid 9 and there is no influence from the grid impedance.

The method according to the present invention has the benefit that it can operate on a wide range of inputs. The method does impose almost no condition on the shape of the measured current and voltage signals. In contrast to conventional algorithms which assume that the measured signals are pure or very near to pure sinus, the method according to the present invention can operate on measured current and voltage signals of any shape or form. In a power check state, the signals generated are normally high-frequency non-sinusoidal ones. The main premise of the method comprises the duration of the signal which has reached a steady state, so that the captured signal carries enough information for analyses. Normally, the required time is in the order of tens of milliseconds and can be readily achieved.

The method according to the present invention further is robust. The method is based on a strong mathematical basis in the frequency domain and is thus very stable. In preliminary tests performed using the simulation model, the capacitance C could be detected using white noise as a hypothetical output voltage of the bridge.

The computer-implemented method according to the present invention has the further advantage that it is easy to implement. Although the proof of the method can be given as a frequency domain, its implementation is in a preferred embodiment in the time domain. Further, the computer-implemented method according to the present invention can be performed in real time. The computer-implemented method according to the present invention is in a preferred embodiment not using frequency domain calculations like FFT. As a consequence, the method does not require a huge memory size of the data memory to capture enough data and does not require to perform complex matrix calculations for the analyzing of the data. The method requires few variables to perform the required calculations. The computer-implemented method can be performed by procedures and programs as illustrated in the flowcharts. These procedures can also be very light-weight and may require few program lines (roughly less than 100 program lines). Consequently, the memory occupied by the procedure or program implementing the computer-implemented method according to the present invention can be small.

The computer-implemented method according to the present provides a lifecycle support benefit. In long term, the changes in the capacitance C along with the temperature stamp can be monitored, e.g., via a remote web-based server 5. This can be performed for all inverters 1 installed in divergent climate regions all over the world. Consequently, after considerable time including e.g., several years, there is a rich database which can be used to analyze the performance and aging behavior of the components and elements of the different inverters in real ambient conditions. Consequently, better decisions can be made to analyze and predict future failures as well as evaluating the vendors of the components and improving the designs of the inverters for the future.

The method according to the present invention provides a correction of the inverter operation. The temperature capacitance data provided by the measurements can be used to interpolate the capacitance C of the AC capacitor within the AC filter stage 7 during the operation of the inverter 1, e.g., in mid-day and not only in the morning. If necessary, corrections can be made by the controller 2 of the inverter 1 to compensate for observed changes of the capacitance C of the AC capacitor within the AC filter stage 7.

The method further provides an EMC improvement. With a deviation or drift of the capacitance C of the AC capacitor over time, the operation of the AC filter stage 7 can deviate from the expected operation according to its design. Eventually, more harmonics can be injected into the power supply grid 9. Accordingly, online corrective actions or compensations can be performed by the method according to the present invention to suppress the injection of unwanted harmonics into the power supply grid 9.

The invention claimed is:

1. A method for enhancing an operation behavior of an inverter, said method comprising the steps of: calculating by a processor of the inverter during a startup phase of the inverter in the time domain and in real time instantaneously a capacitance, C of an AC capacitor of an AC-filter stage of said inverter for each electrical power supply phase of the inverter on the basis of a measured voltage signal and a measured current signal for the respective electrical power supply phase as a ratio between a root mean square DC-free quadrature current value and a root mean square DC-free voltage value on the basis of a predefined minimum number of voltage signal samples of the measured voltage signal and current signal samples of the measured current signal to compensate effects of harmonics in the frequency domain, wherein during the startup phase the AC-filter stage of the inverter is separated by a grid relay from a public or stand-alone power supply grid or from a backup system; and compensating by the processor of the inverter during a power feed in of electrical power by the inverter automatically an observed change of the calculated capacitance, C, of the AC capacitor of the AC-filter stage of said inverter over time by adjusting the AC current generated by the inverter for the respective electrical power supply phase to optimize a reactive current injection, wherein the power feed in of the electrical power by the inverter is started after closing the grid relay to the public or stand-alone powers supply grid or backup system.

2. The method according to claim 1 wherein if the calculated capacitance, C, of the AC capacitor of the AC-filter stage of said inverter is found to be not within a predefined admissible capacitance tolerance range ranging between a minimum capacitance and a maximum capacitance, the inverter is automatically shutdown and/or a warning message is sent by the processor of the inverter to a remote server or output via a user interface of the inverter and/or an automatic switchover to a redundant AC capacitor is triggered by a processor of the inverter.

3. The method according to claim 1 wherein after calculating the capacitance, C, of the AC capacitor of the AC-filter stage of said inverter the calculated capacitance, C, is stored along with a measured ambient temperature, T, a momentary humidity, H, measured by humidity sensor and along with a time stamp, t, as a curve C(T, H, t) in the local storage and/or a database of a cloud server.

4. The method according to claim 1 wherein a phase and/or an amplitude of the AC current generated by the inverter is adjusted automatically by the processor of the inverter during a power feed in of electrical power by the inverter to compensate automatically the observed change of the capacitance, C, of the AC capacitor.

5. The method according to claim 2 wherein if an online calibration has been activated it is checked whether a temperature value of the-ambient temperature, T, is inside or outside a predefined admissible temperature range and if the ambient temperature, T, is found to be outside the predefined admissible temperature range a mapping of a real-time capacitance, C, of the AC capacitor is performed based on the stored curve C(T, H, t) to estimate a real-time capacitance of the AC capacitor based on the stored curve C(T, H, t), wherein if the mapped capacitance, C, of the AC capacitor of said inverter is not within the predefined range, the inverter is automatically shutdown and/or a warning message is sent by the processor of the inverter to a remote server or output via a user interface of the inverter and/or an automatic switchover to a redundant AC capacitor is triggered by a processor of the inverter.

6. The method according to claim 3 wherein the calculated capacitance, C, of the AC capacitor and the associated measured ambient temperature, T, the humidity, H, and the associated time stamp, t, stored during the startup phase of the inverter in the database of the cloud server are interpolated by an artificial intelligence module of the cloud server to provide a fitted curve (C(T, H, t)) representing an expected capacitance behavior of the AC capacitor of said inverter used to predict the operational behavior of the AC capacitor and used to classify defective AC capacitors in fault classes.

7. The method according to claim 6 wherein predictive maintenance operations are triggered automatically by the inverter or by the cloud server in response to the predicted operational behavior of the AC capacitor and/or faults classes in the AC capacitor.

8. The method according to claim 1 wherein calculating the capacitance, C, of the AC capacitor during the startup phase of the inverter comprises the following sub steps:
calculating a quadrature current signal using an integral of the measured current signal, calculating an average quadrature current value for the calculated quadrature current signal and calculating a mean square quadrature current value for the calculated quadrature current signal.

9. The method according to claim 8 wherein calculating the capacitance, C, of the AC capacitor during the startup phase of the inverter further comprises the following sub steps:

calculating an average voltage value using the integral of the measured voltage signal and calculating a mean square voltage value for the measured voltage signal.

10. The method according to claim 9, wherein the capacitance, C, of the AC capacitor of said inverter for each electrical power supply phase of the inverter is calculated during the startup phase of the inverter by a processor of the inverter on the basis of the predefined minimum number of voltage signal samples and current signal samples, wherein at least three-to four periods of the measured voltage signal and of the measured current signal are used for calculating the mean square quadrature current value and for calculating the mean square voltage value.

11. The method according to claim 8 wherein calculating the capacitance, C, of the AC capacitor during the startup phase of the inverter further comprises the following sub steps:

calculating the root mean square DC-free quadrature current value for the current as a square root of the difference between the square value of the calculated root mean square quadrature current value and the square value of the calculated average quadrature current value.

12. The method according to claim 8 wherein calculating the capacitance, C, of the AC capacitor during the startup phase of the inverter further comprises the following sub steps:

calculating the root mean square DC free voltage value for the voltage as a square root of the difference between the square value of the calculated root mean square voltage value and the square value of the calculated average voltage value.

13. The method according to claim 5 wherein the automatic compensation of the capacitance, C, of the AC capacitor of said inverter during power feed in of electrical power by the inverter is performed if the online capacitance calibration has been activated by a remote cloud server or by a user via a user interface of the inverter.

14. A single or multiphase inverter for injection of electrical power into a public power supply grid or stand-alone power supply grid or backup system, said inverter comprising a processor adapted to perform the method according to claim 1.

15. The inverter according to claim 14 comprising for each electrical power supply phase a current sensor adapted to measure the current signal and a voltage sensor adapted to measure the voltage signal.

16. The inverter according to claim 14 further comprising a communication interface for communication with a remote cloud server and/or a user interface unit adapted to display the calculated capacitance, C, of the AC capacitor and/or to set parameters of the inverter and being linked to the inverter or integrated in said inverter.

17. The inverter according to claim 14 comprising at least one DC input to receive electrical DC current generated by a DC source including at least one photovoltaic panel, a battery or other DC current generator.

18. The method according to claim 2 wherein after calculating the capacitance, C, of the AC capacitor of the AC-filter stage of said inverter the calculated capacitance, C, is stored along with a measured ambient temperature, T, a momentary humidity, H, measured by humidity sensor and along with a time stamp, t, as a curve C(T, H, t) in the local storage and/or a database of a cloud server.

19. A single or multiphase inverter for injection of electrical power into a public power supply grid or stand-alone power supply grid or backup system, said inverter comprising a processor adapted to perform the method according to claim 2.

* * * * *